(12) United States Patent
Ten

(10) Patent No.: US 8,159,553 B2
(45) Date of Patent: Apr. 17, 2012

(54) GENERATING A COLOR CHARACTERIZATION MODEL FOR AN INPUT IMAGING DEVICE

(75) Inventor: Arkady Ten, Sunnyvale, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 622 days.

(21) Appl. No.: 12/338,951

(22) Filed: Dec. 18, 2008

(65) Prior Publication Data

US 2010/0157092 A1    Jun. 24, 2010

(51) Int. Cl.
*H04N 5/228* (2006.01)
*H04N 17/02* (2006.01)
*H04N 17/00* (2006.01)
*H04N 1/46* (2006.01)

(52) U.S. Cl. ............ 348/222.1; 348/187; 348/188; 348/189; 345/591; 345/600; 358/539

(58) Field of Classification Search .......... 382/167, 382/162; 358/1.9, 2.23, 535, 589, 539; 348/221, 348/223, 187, 188, 222.1

See application file for complete search history.

(56) References Cited

U.S. PATENT DOCUMENTS

| 6,349,185 | B1 * | 2/2002 | Burkes et al. ............ 399/49 |
| 6,480,299 | B1 | 11/2002 | Drakopoulos et al. |
| 7,251,058 | B2 | 7/2007 | Pop |
| 2005/0273011 | A1 * | 12/2005 | Hattery et al. .......... 600/476 |
| 2006/0071937 | A1 * | 4/2006 | Tin ........................... 345/591 |
| 2009/0033677 | A1 * | 2/2009 | Bezryadin ................. 345/590 |
| 2009/0080004 | A1 * | 3/2009 | Wang et al. .............. 358/1.9 |

OTHER PUBLICATIONS

K. Barnard, et al., "Camera Characterization for Color Research", Color Research and Application, 2002, pp. 152-163, vol. 27, No. 3.

* cited by examiner

*Primary Examiner* — Sinh Tran
*Assistant Examiner* — Shahbaz Nazrul
(74) *Attorney, Agent, or Firm* — Fitzpatrick, Cella, Harper & Scinto

(57) ABSTRACT

A method of generating a color characterization model for an input imaging device includes capturing a target having plural patches using the input imaging device to produce plural digital values in a device-dependent color space, the plural digital values having corresponding target measurements in a color characterization set. The method further includes determining if any of the plural digital values are collinear with each other, and removing, in a case where it is determined that digital values are collinear with each other, at least one of the collinear digital values and corresponding target measurements from the color characterization data set. In addition, the method includes generating the color characterization model for the input imaging device based on the plural digital values and corresponding target measurements remaining in the color characterization set. An apparatus for generating a color characterization model for an input imaging device is also provided.

21 Claims, 6 Drawing Sheets

GENERATING A COLOR CHARACTERIZATION MODEL FOR AN INPUT IMAGING DEVICE

BACKGROUND OF THE INVENTION

1. Field of the Invention

The invention relates to the field of input imaging devices, and more particularly relates to generating a color characterization model for an input imaging device.

2. Description of the Related Art

Color characterization typically refers to a process that results in a model or a profile, which models the color characteristics and properties of an input imaging device. Models and profiles are commonly used to predict the color characteristics of the input imaging device.

Color characterization of an input imaging device typically involves the use of a target with multiple color patches thereon. For example, the target may be a GretagMacbeth ColorChecker DC color chart, which typically has 240 differently-colored patches thereon. To characterize the input imaging device, two independent measurements can be made. The first measurement is typically made with a highly accurate device such as a spectroradiometer, so as to provide a standard against which the second measurement is compared. The second measurement is typically made with the input imaging device. The measurements are then compared, and a mapping is created so as to provide the color characterization for the input imaging device.

However, using all available or pre-selected patches for color characterization of the input imaging device may result in lower accuracy for the color characterization. In this regard, characterization algorithms are generally based on the assumption of a unique relationship between measurements of the target and corresponding digital values produced by the input imaging device. In other words, it is typically assumed that every color of the target when captured by the input imaging device is represented by a unique combination of device values. Also, if digital values are different, colors of the target are assumed to be different. Thus, the capture of a color target with a unique set of color patches should result in a unique set of device values. In general, if this uniqueness assumption is not fulfilled, the characterization algorithms may produce suboptimal results.

However, there are two situations when the uniqueness assumption may fail. The first situation deals with uneven lighting conditions, where lighting is positioned in such way that different parts of the target are illuminated differently. For example, light intensity may change across a target, or spectral power distribution of the light falling on the target may vary across the target. In such cases, patches of the same reflectance located at different parts of the target may produce different device values when captured by the input imaging device. Further, uneven lighting may result in patches of different colors having the same device values.

A second situation in which the uniqueness assumption may fail is what may be referred to as the generic assumption on lighting conditions and input imaging devices. Targets are usually designed for a generic device and for generic lighting conditions. Thus, targets may ignore the specific behaviors and characteristics of a particular device and/or specific lighting conditions. In this regard, a certain input imaging device may distinguish a pair of patches under certain illumination, while another input imaging device may render the pair of patches into the same device values. In addition, the use of a light source that contains a significant chromatic component may result in rendering some patches as indistinguishable by a specific input imaging device. For example, if a color target is lit by blue light, an input imaging device may not discriminate some patches in the red area. This may lead to less accuracy when characterizing the input imaging device.

Thus, there is a need for systems and methods for improved accuracy when generating a color characterization model for an input imaging device.

SUMMARY OF THE INVENTION

Disclosed embodiments describe systems and methods for generating a color characterization model for an input imaging device. Certain disclosed embodiments provide for capturing a target having plural patches using the input imaging device to produce plural digital values in a device-dependent color space, the plural digital values having corresponding target measurements in a color characterization set. Collinear digital values and corresponding target measurements are removed from the color characterization data set. The color characterization model for the input imaging device is generated based on the plural digital values and corresponding target measurements remaining in the color characterization set.

In one aspect of the disclosure, a method of generating a color characterization model for an input imaging device is provided. The method includes capturing a target having plural patches using the input imaging device to produce plural digital values in a device-dependent color space, the plural digital values having corresponding target measurements in a color characterization set. The method further includes determining if any of the plural digital values are collinear with each other, and removing, in a case where it is determined that digital values are collinear with each other, at least one of the collinear digital values and corresponding target measurements from the color characterization data set. In addition, the method includes generating the color characterization model for the input imaging device based on the plural digital values and corresponding target measurements remaining in the color characterization set.

In a further aspect of the disclosure, a computer-readable storage medium storing a computer-executable program for generating a color characterization model for an input imaging device is provided. The program includes code for capturing a target having plural patches using the input imaging device to produce plural digital values in a device-dependent color space, the plural digital values having corresponding target measurements in a color characterization set. The program further includes code for determining if any of the plural digital values are collinear with each other, and removing, in a case where it is determined that digital values are collinear with each other, at least one of the collinear digital values and corresponding target measurements from the color characterization data set. In addition, the program includes code for generating the color characterization model for the input imaging device based on the plural digital values and corresponding target measurements remaining in the color characterization set.

In yet a further aspect of the disclosure, an apparatus for generating a color characterization model for an input imaging device is provided. The apparatus includes processing logic configured to capture a target having plural patches using the input imaging device to produce plural digital values in a device-dependent color space, the plural digital values having corresponding target measurements in a color characterization set. The processing logic is further configured to determine if any of the plural digital values are collinear with each other, and remove, in a case where it is determined that digital values are collinear with each other, at least one of the collinear digital values and corresponding target measurements from the color characterization data set. In addition, the processing logic is configured to generate the color characterization model for the input imaging device based on the plural digital values and corresponding target measurements remaining in the color characterization set.

The input imaging device can be a camera. The device-dependent color space can be ROB. Digital values with all channel values below a predetermined threshold can be removed from the plural digital values, prior to the determining. The removing can include removing the first occurrence of collinear digital values.

The at least one of the collinear digital values can correspond to a redundant value. The at least one of the collinear digital values can correspond to a value which is beyond the discrimination capabilities of the input imaging device for given lighting conditions.

The determining can be based on the boolean inequality:

$$\frac{|a|+|b|}{|a+b|} > 1+\varepsilon,$$

wherein a and b represent vectors for two of the plural digital values, $\varepsilon$ represents a threshold parameter for collinearity, and if the inequality is true, the two digital values represented by a and b are not collinear with each other.

The target measurements can be spectral or colorimetric. The target measurements can be premeasured by a spectroradiometer or a calorimeter. This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

Figure 1:
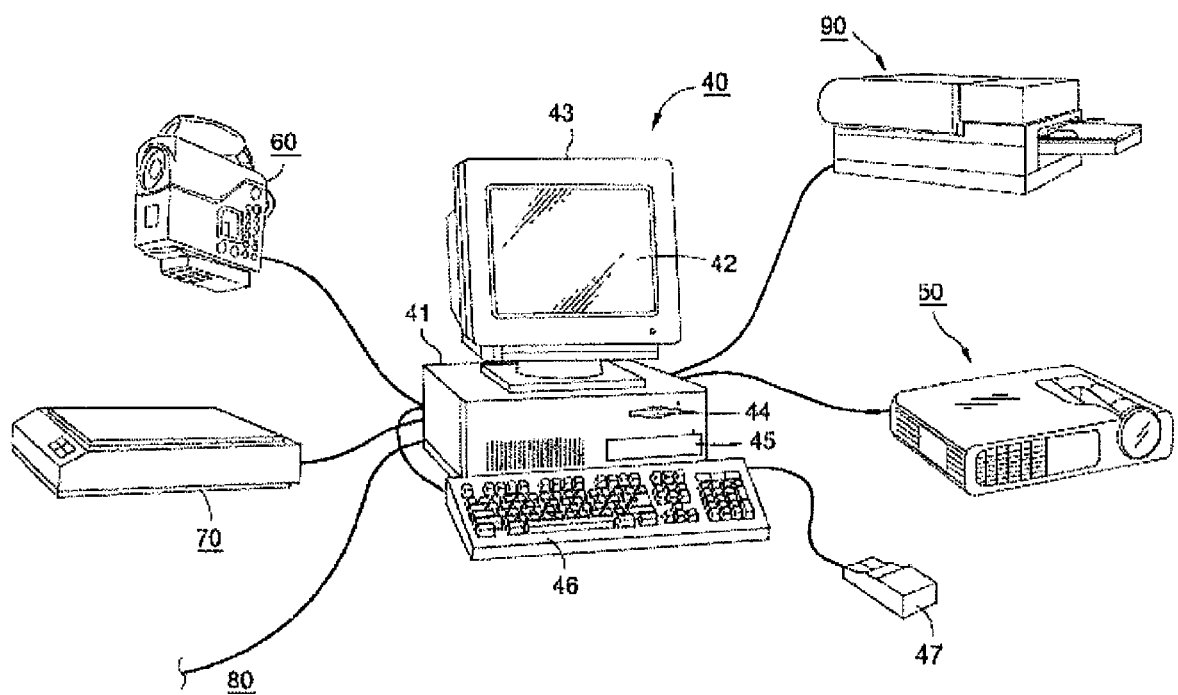
FIG. 1 is a representative view of computing equipment relevant to one example embodiment.

FIG. 1 is a representative view of computing equipment, peripherals and digital devices, relevant to one example embodiment. Computing equipment 40 includes host computer 41 which generally comprises a programmable general purpose personal computer thereinafter "PC") having an operating system such as Microsoft® Windows® or Apple® Mac OS® or LINUX, and which is programmed as described below so as to perform particular functions and in effect to become a special purpose computer when performing these functions. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Host computer 41 also includes computer-readable memory media such as computer hard disk 45 and DVD disk drive 44, which are constructed to store computer-readable information such as computer-executable process steps. DVD disk drive 44 provides a means whereby host computer 41 can access information, such as image data, computer-executable process steps, application programs, etc. stored on removable memory media. In an alternative, information can also be retrieved through other computer-readable media such as a USB storage device connected to a USB port (not shown), or through network interface 80. Other devices for accessing information stored on removable or remote media may also be provided.

Digital color camera 60 is a first example of an input imaging device, and in this example is provided for sending digital image data to host computer 41. Digital color scanner 70 is a second example of an input imaging device, and in this example is provided for scanning documents and images and sending the corresponding image data to host computer 41. A color characterization model can be generated for digital color camera 60, digital color scanner 70, or another input imaging device, according to example embodiments.

Projector 50 is a first example of a color output device, and is provided for projecting images in accordance with image data from host computer 41 onto a projection screen (not shown). Printer 90 is a second example of a color output device, and is provided for forming color images on a recording medium such as paper or transparencies or the like.

Of course, host computer 41 may acquire digital image data from other sources such as a digital video camera, a local area network or the Internet via network interface 80. Likewise, host computer 41 may interface with other color input or output devices) such as color input or output devices accessible over network interface 80.

Figure 2:
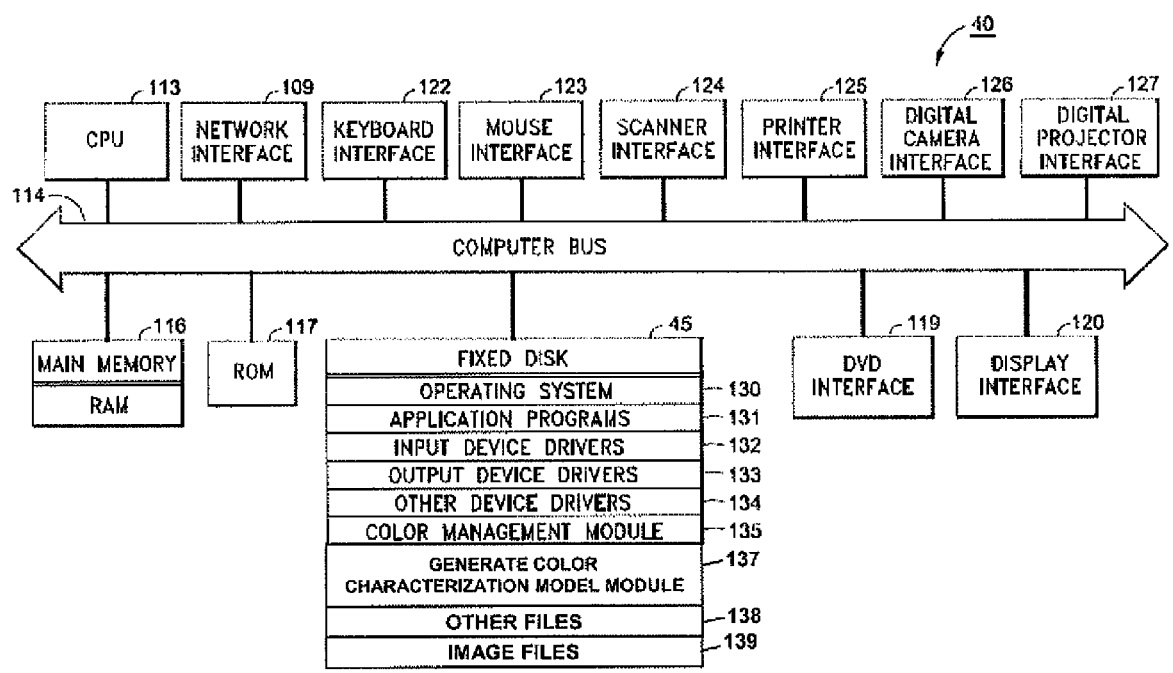
FIG. 2 is a detailed block diagram depicting the internal architecture of the host computer shown in FIG. 1.

FIG. 2 is a detailed block diagram showing the internal architecture of host computer 41 of computing equipment 40. As shown in FIG. 2, host computer 41 includes central processing unit (CPU) 113 which interfaces with computer bus 114. Also interfacing with computer bus 114 are hard disk 45, network interface 109, random access memory (RAM) 116 for use as a main run-time transient memory, read only memory (ROM) 117, DVD disk interface 119, display interface 120 for monitor 43, keyboard interface 122 for keyboard 46, mouse interface 123 for pointing device 47, scanner interface 124 for scanner 70, printer interface 125 for printer 90, digital camera interface 126 for digital camera 60, and digital projector interface 127 for digital projector 50.

RAM 116 interfaces with computer bus 114 so as to provide information stored in RAM 116 to CPU 113 during execution of the instructions in software programs such as an operating system, application programs, color management modules, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable software programs, to the extent that such software programs have a need to access and/or modify the data.

As also shown in FIG. 2, hard disk 45 contains operating system 130, application programs 131, such as word processing programs or a graphic image management programs. Hard disk 45 also contains device drivers for software interface to devices, such as input device drivers 132, output device drivers 133, and other device drivers 134. Image files 138, including color image files, and other files 139 are available to color input or output devices and for manipulation by application programs.

Color management module (CMM) 135 manages colors so as to maintain good color fidelity for color images that are transferred from a source device to a destination device, such as the transfer of color image data from capture by digital camera 60 to display by projector 50. CMM 135 generally comprises computer-executable process steps that accept a source color image having colors with colorant values in a source device dependent color system, and that generate a destination color image having colors with counterpart colorant values in a destination device dependent color space. CMM 135 generally renders color image data from a device-dependent color space to a device-independent color space (e.g., for a source device), and vice versa (e.g., for a destination device). For a source device, for example, CMM 135 may access a color characterization model which is generated by module (GCCMM) 137. GCCMM 137 will be described in further detail below with reference to FIG. 4. For the destination device, CMM 135 typically uses measurement data from color measurement profiles to generate the device transforms necessary to transform color image data into the color space of the destination color image data.

CMM 135 and/or GCCMM 137 may be configured as a part of operating system 130, as part of an input device driver 132 or output device driver 133, or as a stand-alone application program such as a color management system. CMM 135 and/or GCCMM 137 may also be configured as a plug-in or dynamic link library (DLL) to the operating system, device driver or application program. For example, CMM 135 and/or GCCMM 137 according to example embodiments may be incorporated in an input device driver for execution in a computing device, such as a camera driver, embedded in the firmware of an input device, such as a camera, or provided in a stand-alone color management application for use on a general purpose computer. In one example embodiment, CMM 135 and/or GCCMM 137 are incorporated directly into the operating system for general purpose host computer 41. It can be appreciated that the present disclosure is not limited to these embodiments and that the disclosed color management module may be used in other environments in which color management is used.

Figure 3:
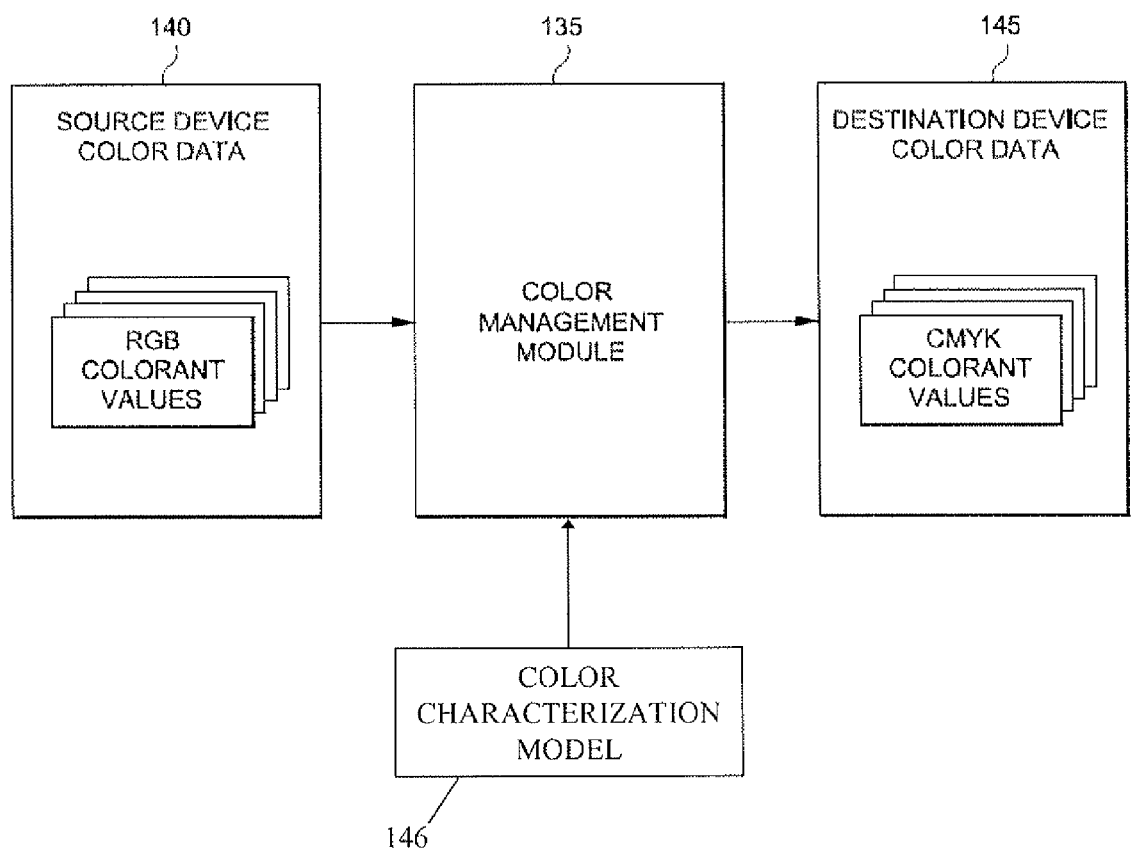
FIG. 3 is a representational view of color transform processing performed by a color management module according to an example embodiment.

FIG. 3 shows a representational view of color transform processing performed by a color management. As explained herein above, a source color image 140 for a source device contains colorant values in a source device color space, such as RGB colorant values in an RGB color space for a scanner or camera or LCD display. CMM 135 is applied to the source device colorant values so as to obtain a counterpart color image 145 for a destination device. Because of the effect of processing by CMM 135, the destination color image 145 can exhibit good color fidelity relative to the source color image 140, despite a change from the source device to the destination device, and despite other changes such as changes in viewing conditions and output media. Color image 145 contains colorant values in the destination device color space, such as CMYK colorant values in a CMYK color space for a color laser printer.

For the source device color data, CMM 135 typically operates to accept color values in device-dependent coordinates (e.g., RGB coordinates), to apply a color characterization model 146, and to output corresponding color values in the device-independent coordinates (such as Luv). In this regard, color characterization model 146 is a data structure by which color behavior of a color device is modeled, and which performs the transformation from the device-dependent color space of an input imaging device to a device-independent color space. Color characterization model 146 can be embedded within CMM 135, or can be accessed by CMM 135. Color characterization model 146 can be embodied into a single device driver such as scanner driver or camera driver (e.g., input device drivers 132). Color characterization model 146 model can be generated by GCCMM 137, will be described in greater detail below with reference to FIG. 4.

Still referring to FIG. 3, CMM 135 can further operate to transform the device-independent coordinates into device-dependent coordinates for a an output device (e.g., a printer or monitor) based on an inverse model. In addition, CMM 135 can operate to perform gamut-mapping between input imaging and output devices.

CMM 135 supports a variety of source and destination devices. In one example, the source device might be digital camera 60 which captures all image of a natural scene, and the destination device might be color laser printer 90 which produces a printout of the captured image. Other combinations and permutations are possible and will be evident to those of ordinary skill in the art.

Figure 4:
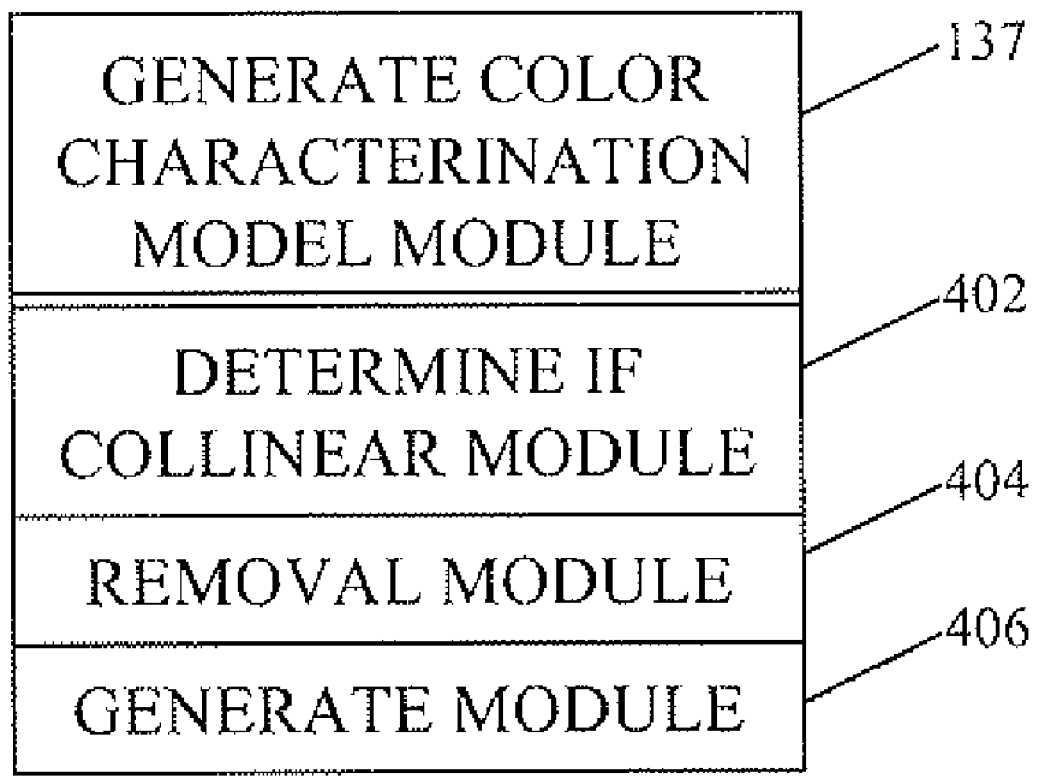
FIG. 4 is a representational view of generating a color characterization model according to an example embodiment.

FIG. 4 is a representational view of generating a color characterization model according to an example embodiment. As can be seen in FIG. 4, generated color characterization module (GCCMM) 137 of FIG. 1 can include determine collinearity module 402, a removal module 404 and a generate module 406. Modules 137, 402, 404 and 406 of FIG. 4 can be implemented as additional software or hardware modules in the color characterization workflow.

As noted above, using all available or pre-selected patches for color characterization of an input imaging device may result in suboptimal results for the corresponding color characterization model. A combination of a specific camera and a light source may result in some patches on the target providing little valuable information for characterization while still introducing measurement and capture noise.

A typical color target is optimized for a generic device and generic lighting, with an example being a GretagMacbeth or a ColorChecker DC color chart. A ColorChecker DC color chart is optimized for use under close to daylight light sources. Being illuminated by an essentially reddish light source, such a color chart may produce fewer distinguishable color patches with a blue component. Thus, a camera may not discriminate some of the patches which have variation in the blue component. As a result, a captured test image used for characterization may have less coverage for blue area, resulting in a number of patches with almost identical RGB values.

For example, in certain cases, if the color target is illuminated by a yellow light source with no blue component, any patches which have the same reflectance in a yellow part of the spectrum but a different reflectance in a blue part of the spectrum will typically be indistinguishable. These indistinguishable color patches will typically not provide any advantages to color characterization, but rather will add measurement and capture noise. Thus, such color patches are seen to be excessive.

For linear capture devices (e.g., devices having a linear relationship between light intensity and RGB output), patches lying on a line passing through RGB=0 in RGB space may be excessive. The excessive patches may result in over-fitting and/or may introduce high frequency variations related to a particular fitting algorithm. Additionally, processing of excessive patches requires additional computational power and memory without necessarily improving calibration/characterization.

Further, some training targets may be originally unbalanced (e.g., some targets may have better color coverage in certain areas than others). Such imbalance may bias characterization toward the areas with better coverage. For instance, a hypothetical target may have many color patches in red part of the spectra, while covering little of the green and blue areas. For fitting algorithms which do not discriminate the color of patches but rather treat them as equals, abundance of the red patches and the lack of green and blue patches typically results in better characterization accuracy for the red colors in exchange for accuracy for the green and blue colors.

As such, using a hard coded pre-selection is seen to be inflexible, and can typically be tuned to only one combination of a light source and a capture device. Training targets are typically not optimized for a specific camera/light source combination and thus, may be sub-optimal. Sub-optimal training targets may introduce noise to characterization, may introduce fitting/approximation artifacts, may bias characterization toward better represented colors, and require more computational power.

As noted above, a target having plural patches is typically captured using an input imaging device to produce plural digital values in a device-dependent color space. The plural digital values have corresponding target measurements in a color characterization set. Referring to FIG. 4, once a target has been captured, a determine if collinear module 402 can be used to determine if any of the plural digital values are collinear with each other. In a case where it is determined that digital values are collinear with each other, a removal module 404 can be used to remove at least one of the collinear digital values and corresponding target measurements from the color characterization data set.

As such, generally excessive patches (e.g., patches whose digital values are collinear with each other) can be removed before generating the color characterization model. The color target captured by a digital camera can be analyzed and excessive patches removed. Further, analyzing the target in RGB space can include both light source and the digital camera specifics. For example, under a specific light source and for a specific digital camera, two patches with equal RGB values would be metameric in respect to the digital camera. In other words, the two equal RGB values are indistinguishable even though the patches may have different reflectance. Such patches can be considered as redundant for the digital camera characterization.

As suggested above for linear capture devices, a patch can be considered excessive if it is collinear in the device terms to another patch in a device output space. Collinear device values are ones where one patch can be scaled to the device values of the other—For example, if a patch has R=10, G=128, B=80, a patch can be considered collinear if its RGB values are linearly dependent, e.g. R=a*10, G=a*128, B=a*80, where a is a scalar. Because of the linear dependency, any patch along the line R=a*10, G=a*128, B=a*80 in RGB space does not necessarily provide additional color information for the linear devices. As such, if primaries for an RGB digital camera are found, patches along the above-mentioned line would typically not allow for creating a color model of the camera. At the same time, if the task is to reconstruct a tonal response curve, linearly dependent patches are typically the most valuable.

There are several approaches to find linearly dependent patches. For example, if |a|+|b|=|a+b|, then patches are collinear where a and b are vectors of device values or measurements of color patches. Generally, there are few patches that satisfy the collinearity equation. Thus, collinearity can be determined based on the boolean inequality:

$$\frac{|a|+|b|}{|a+b|} > 1 + \varepsilon, \qquad \text{Equation (1)}$$

wherein a and b represent vectors for two of the plural digital values, $\varepsilon$ represents a threshold parameter for collinearity, and if the inequality is true, the two digital values represented by a and b are not collinear with each other.

With reference to a ColorChecker DC color target, this target typically contains 240 color patches. One approach to select a non-collinear subset of patches is to perform the following steps:

(1) Take a source set of all the patches;
(2) Choose a first patch and move that patch into a selection subset;
(3) Compare all the patches from the set and move all the patches satisfying the inequality of Equation (1) to the subset;
(4) Replace the source set with the selected subset;
(5) Choose the next patch (e.g., the second patch on the second iteration, the third patch on the third iteration, and so on, until the last patch); and
(6) If the number of the chosen patches does not exceed the number of elements in the subset, then continue from step (3).

Once all the patches are checked, and the redundant patches are removed, the subset of remaining patches should mutually satisfy Equation (1) and should not contain excessive patches. Thus, referring to FIG. 4, generate module 406 can be used to generate the color characterization model for the input imaging device based on the plural digital values and corresponding target measurements remaining in the color characterization set.

Figure 5A:
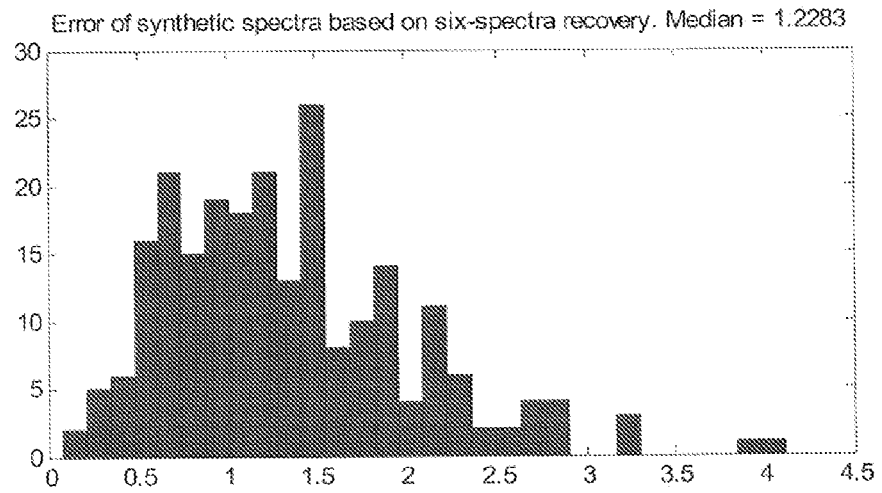
FIGS. 5A and 5B are charts illustrating the improved accuracy of a color characterization model which removes collinear digital values and corresponding target measurements.
Figure 5B:
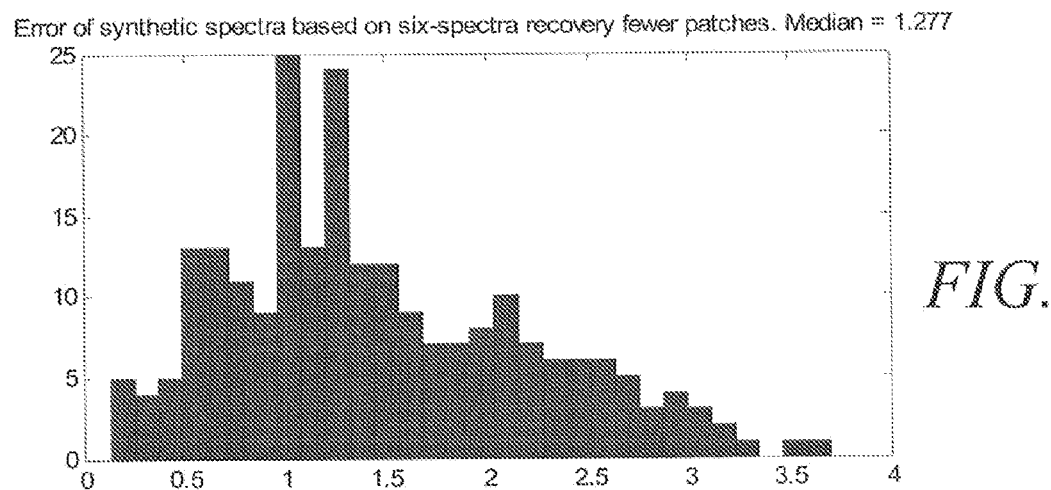

FIGS. 5A and 5B are charts illustrating the improved accuracy of a color characterization model which removes collinear digital values and corresponding target measurements. As suggested above, removing redundant patches can improve color characterization of the input imaging device. For example, such removal of collinear patches can reduce the effect of measurement and capture noise, increase the stability of fitting algorithms and significantly reduce the chances of over-fitting, thus increasing smoothness of characterization. Such removal can further reduce color biasing, and can take into account the specifics of a capture device and light sources. Further, such removal can be an automated procedure which is embeddable into existing characterization/calibration software, and can reduce computational demand since the fitting algorithm will typically process fewer patches.

As noted above, a multispectral camera characterization can use a ColorChecker DC with 240 patches. The results of spectral characterization with all patches and with redundant patches removed are shown in FIGS. 5A and 5B, respectively. Using $\varepsilon=0.5*10^{-4}$ for Equation (1) can result in a 138 patch subset, with 102 patches being removed.

As can be seen in FIGS. 5A and 5B, using a reduced number of patches tends to increase accuracy of the characterization. These diagrams also show that the errors are compact and have fewer outcast points for the color characterization where collinear values are removed. The shape of the histogram and absence of outcasts (e.g., points with significantly higher errors) indicates that the characterization where collinear values are removed is smoother then the characterization without the removal.

For example, a singular value decomposition (SVD) can be used with computational complexity $O(n^2)$, where ii is 240 and 138. Thus, removal of excessive patches is seen to result in approximately an algorithm which is 3 times faster, and requires approximately only ⅓ the amount of memory. Further, algorithms using minimization methods may benefit from excessive patch removal in even a greater degree.

The removal of excessive patches is preferably automatic and performed in the input imaging device's color space. As such, removal of metameric and redundant patches for a specific input imaging device and light source is virtually guaranteed. Such selection of patches based on the collinearity defined in Equation (1) provides for a to representative color characterization with reduced time and memory requirements. Further, such selection guards against overfitting and consequently, rolling the capture and processing noise into the characterization.

Thus, the removal of the redundant patches (e.g., patches whose digital values are collinear with each other) can improve the accuracy, stability and performance of the characterization/calibration procedure through selection (preferably automated) of patches specific to a target camera and light source. The calibration process can become more flexible and adaptive to different characterization/calibration targets, light sources and capture devices.

Figure 6:
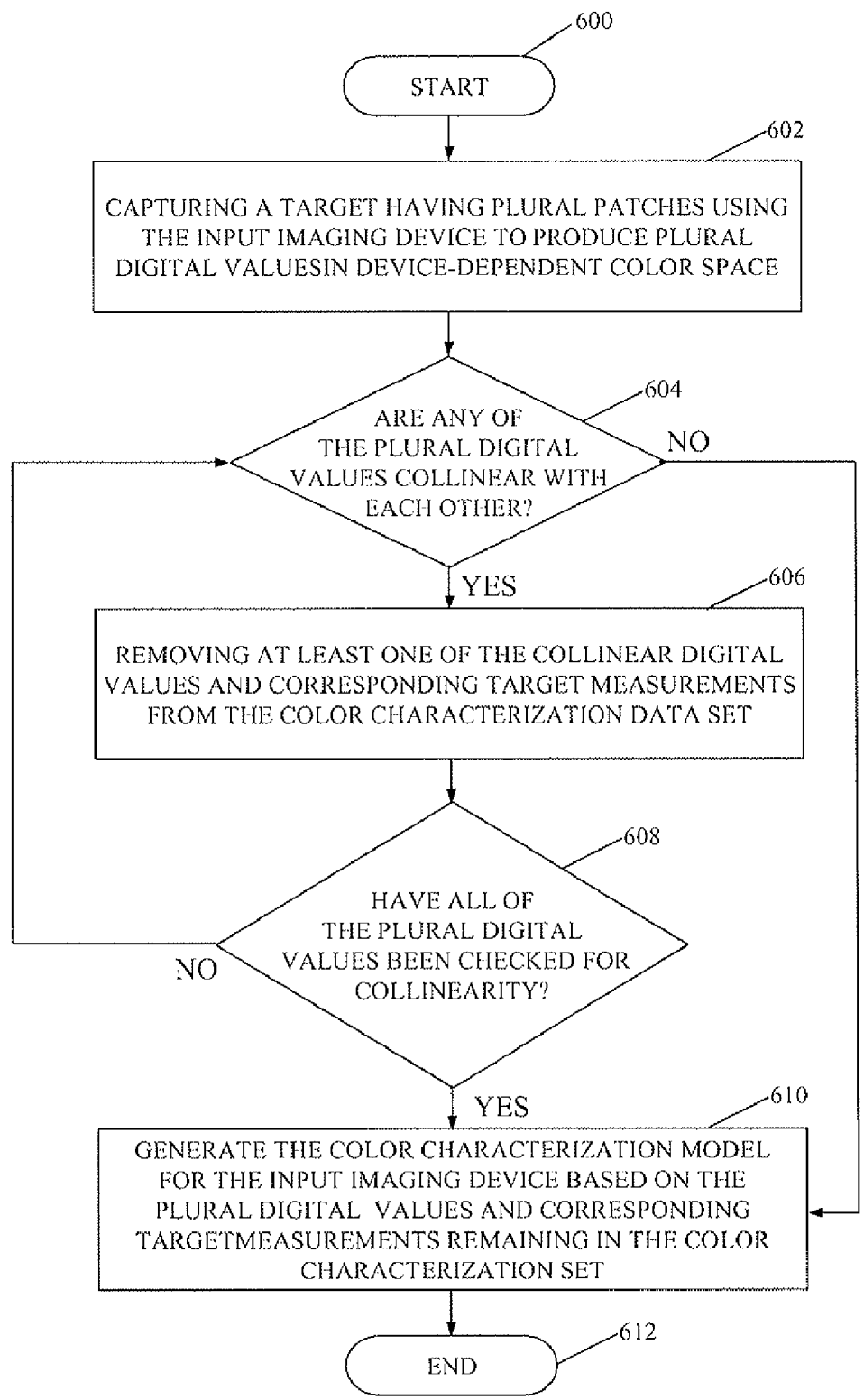
FIG. 6 is a flowchart illustrating an example of generating a color characterization model for an input imaging device.

FIG. 6 is a flowchart illustrating an example of generating a color characterization model for an input imaging device. Following start bubble 600, a target is captured having plural patches using the input imaging device to produce plural digital values in a device-dependent color space (block 602). The plural digital values have corresponding target measurements in a color characterization set. An inquiry is made as to whether any of the plural digital values are collinear with each other (decision block 604). If the answer to this inquiry is yes, then at least one of the collinear digital values and corresponding target measurements are removed from the color characterization data set (block 606). Otherwise, the process continues to block 610 which is described below. Following block 606, an inquiry is made as to whether all of the plural digital values have been checked for collinearity (decision block 608). If the answer to this inquiry is no, the process returns to decision block 604. Otherwise, the process continues to block 610.

For block 610, the color characterization model is generated for the input imaging device based on the plural digital values and corresponding target measurements remaining in the color characterization set. The process then ends (end bubble 612).

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method of generating a color characterization model for an input imaging device, the method comprising:
capturing a target having plural patches using the input imaging device to produce plural digital values in a device-dependent color space, the plural digital values having corresponding target measurements in a color characterization data set;
determining if any of the plural digital values are collinear with each other;
removing, in a case where it is determined that digital values are collinear with each other, at least one of the collinear digital values and corresponding target measurements from the color characterization data set;
generating the color characterization model for the input imaging device based on the plural digital values and corresponding target measurements remaining in the color characterization data set.

2. A method according to claim 1, wherein the input imaging device is a camera.

3. A method according to claim 1, wherein the device-dependent color space is RGB.

4. A method according to claim 1, further comprising:
removing digital values with all channel values below a predetermined threshold from the plural digital values, prior to the determining.

5. A method according to claim 1, wherein the removing comprises removing the first occurrence of collinear digital values.

6. A method according to claim 1, wherein the at least one of the collinear digital values corresponds to a redundant value.

7. A method according to claim 1, wherein the at least one of the collinear digital values corresponds to a value which is beyond the discrimination capabilities of the input imaging device for given lighting conditions.

8. A method according to claim 1, wherein the determining is based on the boolean inequality:

$$\frac{|a|+|b|}{|a+b|} > 1+\varepsilon,$$

wherein a and b represent vectors for two of the plural digital values, $\varepsilon$ represents a threshold parameter for collinearity, and if the inequality is true, the two digital values represented by a and b are not collinear with each other.

9. A method according to claim 1, wherein the target measurements are spectral or colorimetric.

10. A method according to claim 1, wherein the target measurements are premeasured by a spectroradiometer or a colorimeter.

11. A non-transitory computer readable storage medium storing a computer executable program for generating a color characterization model for an input imaging device, the program comprising code for:
capturing a target having plural patches using the input imaging device to produce plural digital values in a device-dependent color space, the plural digital values having corresponding target measurements in a color characterization data set;
determining if any of the plural digital values are collinear with each other;
removing, in a case where it is determined that digital values are collinear with each other, at least one of the collinear digital values and corresponding target measurements from the color characterization data set;
generating the color characterization model for the input imaging device based on the plural digital values and corresponding target measurements remaining in the color characterization data set.

12. A non-transitory computer readable storage medium according to claim 11, wherein the input imaging device is a camera.

13. A non-transitory computer readable storage medium according to claim 11, wherein the device-dependent color space is RGB.

14. A non-transitory computer readable storage medium according to claim 11, the program further comprising code for:
removing digital values with all channel values below a predetermined threshold from the plural digital values, prior to the determining.

15. A non-transitory computer readable storage medium according to claim 11, wherein the removing comprises removing the first occurrence of collinear digital values.

16. A non-transitory computer readable storage medium according to claim 11, wherein the at least one of the collinear digital values corresponds to a redundant value.

17. A non-transitory computer readable storage medium according to claim 11, wherein the at least one of the collinear digital values corresponds to a value which is beyond the discrimination capabilities of the input imaging device for given lighting conditions.

18. A non-transitory computer readable storage medium according to claim 11, wherein the determining is based on the boolean inequality:

$$\frac{|a|+|b|}{|a+b|} > 1+\varepsilon,$$

wherein a and b represent vectors for two of the plural digital values, $\varepsilon$ represents a threshold parameter for collinearity, and if the inequality is true, the two digital values represented by a and b are not collinear with each other.

19. An apparatus for generating a color characterization model for an input imaging device, the apparatus comprising processing logic configured to:

capture a target having plural patches using the input imaging device to produce plural digital values in a device-dependent color space, the plural digital values having corresponding target measurements in a color characterization data set;

determine if any of the plural digital values are collinear with each other;

remove, in a case where it is determined that digital values are collinear with each other, at least one of the collinear digital values and corresponding target measurements from the color characterization data set;

generate the color characterization model for the input imaging device based on the plural digital values and corresponding target measurements remaining in the color characterization data set.

20. An apparatus according to claim 19, wherein the input imaging device is a camera.

21. A method of generating a color characterization model for an input imaging device, the method comprising:

capturing a target having plural patches using the input imaging device to produce plural digital values in a device-dependent color space, the plural digital values having corresponding target measurements in a color characterization data set;

determining if any of the plural digital values are collinear with each other;

removing, in a case where it is determined that digital values are collinear with each other, at least one of the collinear digital values and corresponding target measurements from the color characterization data set without generating other digital values in the device-dependent color space;

generating the color characterization model for the input imaging device based on the plural digital values and corresponding target measurements remaining in the color characterization data set.

* * * * *